United States Patent
Lardennois et al.

(10) Patent No.: US 7,171,196 B2
(45) Date of Patent: Jan. 30, 2007

(54) SYSTEM FOR TRANSMITTING INFORMATION BY RADIO BETWEEN AN INFRASTRUCTURE AND MOBILES

(75) Inventors: Régis Lardennois, Montrouge (FR);
Bénédicte Chochois, Montrouge (FR);
Roland Tousch, Montrouge (FR);
Pascal Leboucher, Montrouge (FR)

(73) Assignee: Siemens Transportation Systems, Montrouge Cedex (FR)

( * ) Notice: Subject to any disclaimer, the term of this patent is extended or adjusted under 35 U.S.C. 154(b) by 217 days.

(21) Appl. No.: 10/732,818

(22) Filed: Dec. 11, 2003

(65) Prior Publication Data
US 2005/0059387 A1    Mar. 17, 2005

(30) Foreign Application Priority Data
Dec. 19, 2002  (FR) .................................... 02 16220

(51) Int. Cl.
*H04Q 7/20*   (2006.01)
(52) U.S. Cl. ............... 455/422.1; 455/436; 455/414.1; 455/345; 340/425.5; 340/426.16; 340/426.2
(58) Field of Classification Search ............... 455/345; 340/426.16, 426.2
See application file for complete search history.

(56) References Cited

U.S. PATENT DOCUMENTS 5,323,446 A * 6/1994 Kojima et al. ............... 455/437
5,530,917 A * 6/1996 Andersson et al. ......... 455/436
5,548,808 A * 8/1996 Bruckert et al. ............ 455/442
5,617,412 A * 4/1997 Delprat et al. .............. 370/281
5,901,144 A * 5/1999 Maki et al. .................. 370/330
5,995,845 A * 11/1999 Lardennois ................. 455/506
6,094,575 A * 7/2000 Anderson et al. ........ 455/422.1
6,130,905 A * 10/2000 Wakayama ................. 375/132

FOREIGN PATENT DOCUMENTS

| DE | 196 30 575 A1 | 2/1998 |
| EP | 0 618 688 A2 | 10/1994 |
| FR | 2 366 751 | 4/1978 |
| FR | 0 838 965 A1 | 4/1998 |

* cited by examiner

*Primary Examiner*—Lester Kincaid
*Assistant Examiner*—Diego Herrera
(74) *Attorney, Agent, or Firm*—Stites & Harbison PLLC; Ross F. Hunt, Jr.

(57) ABSTRACT

The cellular system for transmitting information by radio between an infrastructure and mobiles constrained to travel on a determined path comprises stationary transceiver stations and at least one transceiver carried by each mobile, which transceivers are controlled in such a manner that, while a mobile is in a given cell, exchanges between the mobile and the transceivers allocated to the cell take place on two different frequencies in alternation during two successive radio cycles.

8 Claims, 4 Drawing Sheets

| | F1 | F2 | F3 | F4 | F5 | F6 | F7 | F8 | F9 |
|---|---|---|---|---|---|---|---|---|---|
| 1 | X | | X | | | | | | |
| 2 | X | | | X | | | | | |
| 3 | X | | | | X | | | | |
| 4 | X | | | | | X | | | |
| 5 | X | | | | | | X | | |
| 6 | X | | | | | | | X | |
| 7 | X | | | | | | | | X |
| 8 | | X | | X | | | | | |
| 9 | | X | | | X | | | | |
| 10 | | X | | | | X | | | |
| 11 | | X | | | | | X | | |
| 12 | | X | | | | | | X | |
| 13 | | X | | | | | | | X |
| 14 | | | X | | X | | | | |
| 15 | | | X | | | X | | | |
| 16 | | | X | | | | X | | |
| 17 | | | X | | | | | X | |
| 18 | | | X | | | | | | X |
| 19 | | | | X | X | | | | |
| 20 | | | | X | | X | | | |
| 21 | | | | X | | | X | | |
| 22 | | | | X | | | | | X |
| 23 | | | | | X | X | | | |
| 24 | | | | | X | | | X | |
| 25 | | | | | X | | | | X |
| 26 | | | | | | X | X | | |
| 27 | | | | | | X | | | X |
| 28 | | | | | | | X | | X |

# SYSTEM FOR TRANSMITTING INFORMATION BY RADIO BETWEEN AN INFRASTRUCTURE AND MOBILES

FIELD OF THE INVENTION

The present invention relates to cellular systems for transmitting information by radio between an infrastructure and moving bodies constrained to travel on a determined path, and referred to herein as "mobiles".

A major application of the invention lies in the field of transportation on reserved sites, and in particular in railway networks located at least in part in tunnels, where multiple reflections are particularly to be feared. Nevertheless, the invention is also usable in other fields, in particular for communications with aircraft in flight or on the ground and following well-determined itineraries.

BACKGROUND OF THE INVENTION

A cellular system for transmitting information by radio is already known FR 0 838 965 and U.S. Pat. No. 5,995,845) in which the infrastructure includes stationary transceiver stations distributed along the path. Those stations comprise transceivers, and each cell extends between two transceivers. The transmitters working the same cell are synchronized and transmit using a form of encoding that enables multiple paths to be accommodated or used.

The form of encoding may be constituted in particular by encoding of the orthogonally coded frequency division multiplex (OC FDM) type or of the direct sequence spread spectrum type.

OBJECTS AND SUMMARY OF THE INVENTION

The present invention seeks in particular to further increase immunity to interference. To this end, the invention provides in particular a cellular system for transmitting information by radio, the infrastructure of the system comprising stationary transceiver stations or "radio bases" distributed along the path and allocated to successive cells so that each cell is provided with at least two transceivers at opposite ends thereof and having transmitters that are synchronized and that preferably transmit with a form of encoding that enables multiple paths to be accommodated or used; according to the invention, the transceivers of the stationary stations and at least one transceiver carried by a mobile are controlled in such a manner that, while a mobile is in a given cell, exchanges between the mobile and the transceivers allocated to the cell take place on two different frequencies in alternation during two successive radio cycles.

Such alternation serves to reduce the disturbances caused by interfering transmitters operating at fixed frequency, which may be external to the system or which may be constituted by the transmitters of other cells.

Each cycle is conventionally constituted by a plurality of exchanged frames that are relatively short in order to increase quality of service. Time division multiple access (TDMA) is often used. The frames containing essential information can be systematically transmitted on both frequencies in succession. Other frames can be transmitted once only, and still other frames can be repeated on request following defective transmission.

The pair of frequencies used in a cell is advantageously constituted by two frequencies that are different from those used in the adjacent cells. In portions of the network in the open air, where transmitter range can be very great, the frequency pairs are advantageously allocated from the frequencies that are available in such a manner that the same pair of frequencies is reused only at a distance that is as great as possible. When only a small number of frequencies is available, attempts should be made to ensure that only one common frequency is used between any two cells that might interfere.

In addition to the two transceivers at each end of a given cell, that cell may also have distributed intermediate transceivers allocated thereto.

DESCRIPTION OF PREFERRED EMBODIMENTS

Figure 1:
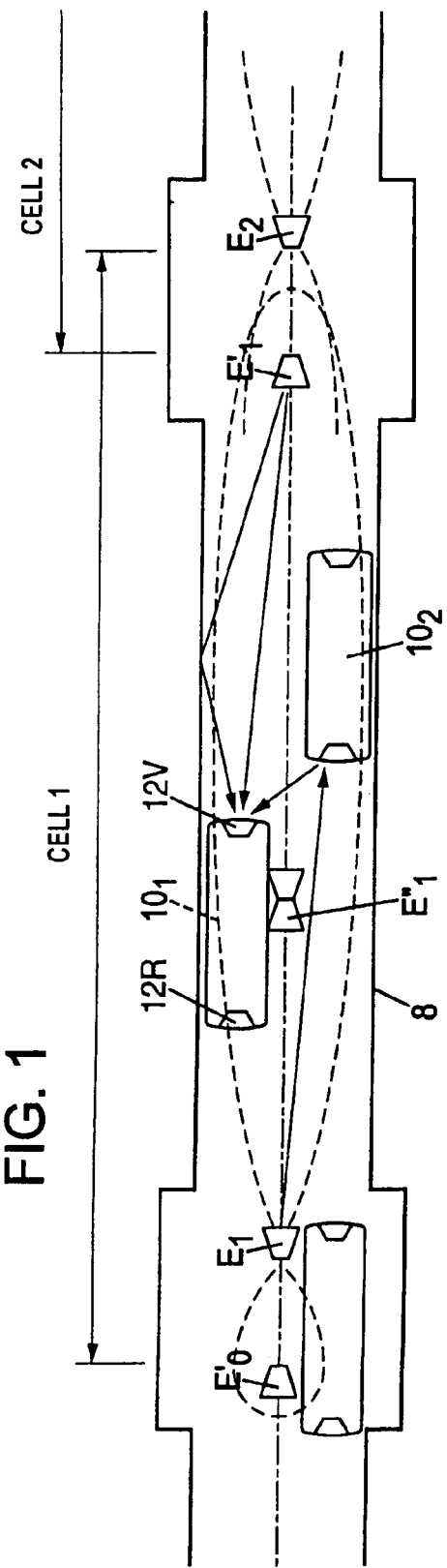
FIG. 1 is a highly simplified diagram showing a distribution in space of stationary station components and of two mobiles placed in a cell.

Before describing the invention, the structure of a system to which it applies is recalled briefly by way of example and with reference to FIG. 1.

FIG. 1 shows a portion of a tunnel 8 in a rail transport system having two tracks which are referred to collectively below as the "way". Along the path of the tracks there are distributed wayside base stations. Cells extend between two base stations. Each base station comprises a transceiver fitted with an antenna which has a narrow lobe in a tunnel or on rectilinear portions. The antennas of transceivers $E_1$, $E'_1$ belonging to two base stations transmit towards each other in cell No. 1 and also present back lobes causing the cell to extend beyond the gap between the stations. In many cases, one or more intermediate stations $E''_1$ are distributed at intervals within a cell between the base stations $E_1$ and $E'_1$. The transceivers allocated to the same cell are synchronized at symbol level. The transceivers of a given cell transmit at the same carrier frequency and constitute a common channel.

Each base station S placed at one end of a cell to which it is allocated, e.g. cell No. 1, is adjacent to another base station having a transceiver $E'_0$ or $E_2$ allocated respectively to cell 0 or to cell 2. In the particular example shown by dashed lines for the antenna of transceiver $E_1$, each antenna presents a relatively narrow main or front lobe directed towards its own cell and a back lobe of smaller intensity. However in practice the lobes of the antennas are optimized as a function of each geographical location. By spacing the radio stations of different cells apart and by increasing the size of the overlap zone between cells it is possible to reduce the total number of stations.

In the embodiment shown, each mobile such as $10_1$, $10_2$ has a transceiver antenna 12V facing forwards and a transceiver antenna 12R facing backwards. As explained below, the antennas can be associated with common transceiver equipment or with distinct pieces of equipment This common piece of equipment (or each piece of equipment if there is more than one) is designed to sum the energy received from the transmitters $E_1$, $E'_1$ while the mobile is in cell No. 1.

Figure 2:
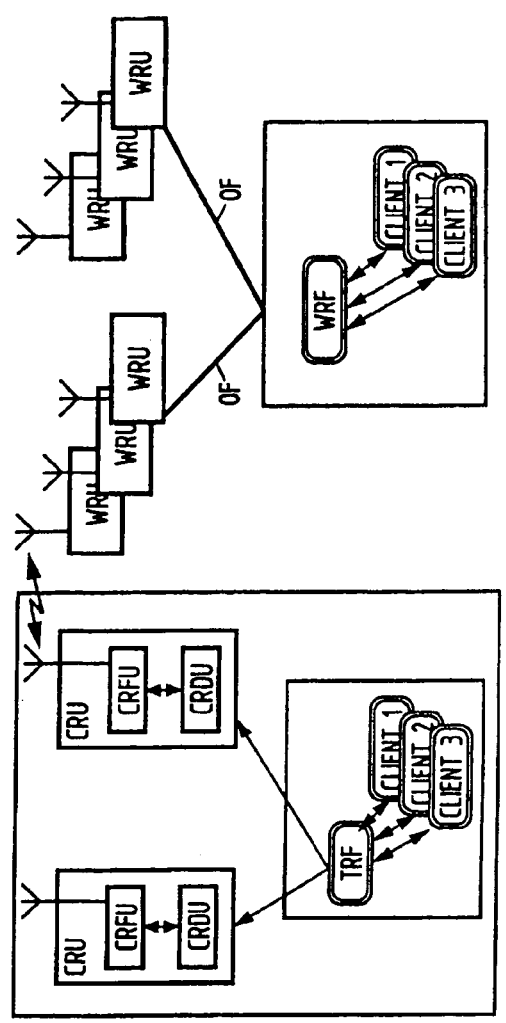
FIG. 2 is a block diagram showing the main components of a system.

Overall, the system may be generally structured functionally as shown in FIG. 2.

The main architecture of that portion of the system which is located beside the wayside may be considered as having four subassemblies.

A wayside cell controller WCC constitutes a host module for the wayside radio function WRF. The wayside cell controller WCC may comprise two wayside transmission units WTU to provide redundancy. These units are placed in equipment premises and are connected:

- by networks, often using an Ethernet protocol, to a zone controller Ze which may itself present redundancy;
- to wayside clients (users of the transmission), in conventional manner; and
- by transmission lines placed along the wayside and generally constituted by optical fiber links OF leading to various pieces of wayside radio equipment, each possibly having two wayside radio units WRU.

In addition, a synchronization link (not shown) is provided between the wayside transmission units for a given cell.

All of the wayside radio units in a given cell can be connected to a common optical fiber interface electronics card in the wayside transmission unit WTU.

Communication between the antennas of the wayside radio units WRU and the antennas 12V and 12R of the transceivers in the mobiles 10 takes place at microwave frequencies, generally in a band that is reserved for spread spectrum applications. The frequency generally lies in the range 2400 megahertz (MHz) to 2483 MHz, or in the range 5725 MHz to 5850 MHz.

Depending on the degree of availability desired for transmission purposes, it is possible to use a transceiver having one or two antennas or two transceivers that are coupled together and connected to a common antenna or to respective antennas.

The car radio unit CRU on board a mobile (e.g. a train) is complex to a greater or lesser extent depending on the constitution of the train.

If it is possible to place antennas on the roof of the train, then it is preferable to use a single CRU in the middle of the train.

If for reasons of loading gauge clearance it is not possible to place an antenna on the roof, it is then necessary to place antennas at both ends of the train, and thus to use radio equipment at each end. Two subassemblies, possibly in the first and last cars, then provide respectively a function of distributing radio on the mobile and a function of selecting radio frequency on the mobile. These two functions can be performed respectively by a car radio distribution unit CRDU and by a car radio frequency unit CRFU connected to one or more antennas.

In addition to the radio part, the mobile carries an on-board control unit providing the radio functions of the on-board part, and referred to as the train radio function TRF. Connections with apparatus and software such as call requests, on-board clients, etc. serve to transfer the orders and information transmitted and distributed via the train radio function TRF.

As mentioned above, exchanges within a cell between stations at the ends of the cell and a mobile within the cell, take place at two different frequencies, in alternation on each radio cycle. The use of more than two frequencies could be envisaged, but provides little extra advantage. In terms of redundancy, any advantage to be obtained by using ore than two frequencies for transferring essential information can be achieved only by transmitting the information three times. In addition, given that only a few frequencies are available, the number of combinations that are possible and that avoid the presence of a common frequency between adjacent cells is small.

Figures 6, 7:
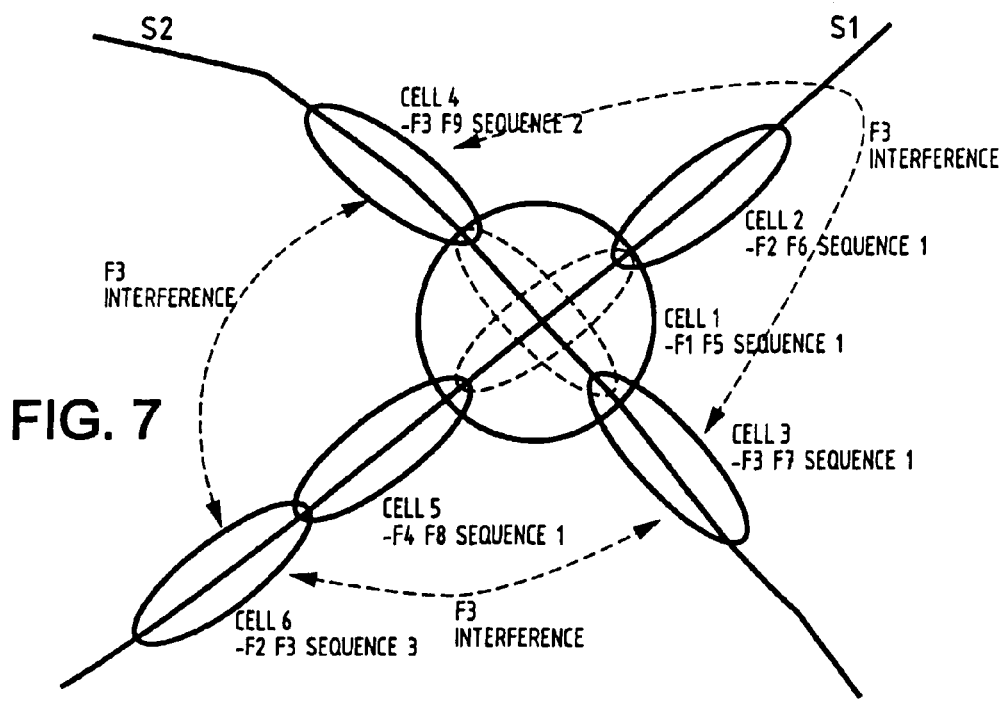
FIG. 6 shows an example of how nine frequency bands can be distributed in pairs.
FIG. 7 is a diagram showing an intersection between two paths and how transmission is managed in the crossover zone.

For example, when the available frequency bandwidth is 83 MHz (as is the case, for example, for the instrumentation and scientific medical (ISM) band of 2400 MHz to 2483 MHz), this band can be subdivided into nine channels having center frequencies F1 to F9. These channels may be 6 MHz wide, being spaced at intervals of 8 MHz to 9 MHz in order to reduce contributions between adjacent channels. Each cell has two non-adjacent ones of these channels at frequencies Fx and Fy associated therewith. This means there exists 28 pairs in which the two frequencies are not adjacent. FIG. 6 shows one possible distribution.

Transmission is generally performed by two-state or four-state phase shift keying, known as binary phase shift keying (BPSK) and quaternary phase shift keying (QPSK), with direct sequence spectrum spreading; it is advantageous to use differential QPSK (DQPSK) mode with four mutually orthogonal spreading sequences. Transmission may be performed using TDMA for the radio links.

Exchanges between the mobile and the stations of the cell takes place in cycles with alternation between the two frequencies Fx and Fy selected for the cell. Each cycle is constituted by a plurality of frames. In each frame, the data rate is generally small enough to obtain a high degree of resistance to interference, to fading, and to multiple paths. A data rate of 32 kilobits per second (kbit/s) or 64 kbit/s is commonly used, even though a higher rate (up to 256 kbit/s) is possible. Although in theory all of the frames of a given radio cycle are transmitted at the same frequency, it can be advantageous, where frame content is considered to be essential, to transmit one or more frames of such content over both frequencies in succession.

In particular, it is possible to use the following distribution within a cycle, with the data frames having a constant length of 200 bits, for example, and with the cycle having a duration of 124 milliseconds (ms). The cycle is subdivided into "time slots" and the data rate is 64 kbit/s.

| | | |
|---|---|---|
| Guard interval | | 1.5 ms |
| Initialization frame | 200 bits | 4.125 ms |
| Guard interval | (enabling the spreading code to be changed) | 1.5 ms |
| Data frames (wayside to train) | 12 messages in 200 bit frames at Fx 12 × 4.125 ms | 49.5 ms |
| Control frames (wayside to train) | 1 frame at Fx: 4.125 ms<br>guard interval: 1.5 ms<br>1 frame at Fy: 4.125 ms | 9.75 ms |
| Entry signature frame (train to wayside) | Twice<br>guard interval 2 ms<br>1 frame of 4.125 ms at Fx | 12.25 ms |
| Data frames (train to wayside) | 8 times:<br>guard interval: 2 ms<br>1 entry signature frame 4.125 ms at Fx<br>1 data frame | 49 ms |
| Total ≈ | | 128 ms |

Only the application content of the frames is enciphered. The entry signature frame might need repeating in the event of the first transmission being poorly received.

The initialization frame constitutes the radio database and is used only by the radio part of the train for configuration purposes.

The data frames going to the trains have content that depends on the application and the "client" terminal or user on the train. These are enciphered.

The cell control frame used by the radio part of the train for configuration purposes contains management information such as the allocation of time slots to different trains.

The entry signature frame is used by the train entering into a cell to identify itself with the wayside radio equipment which is constituted by one or two wayside transmission units WTU.

Finally, the data frames going to the wayside transfer application data. These frames may be transmitted simultaneously to two radio cells when the train is in the overlap zone of two cells.

There follows a brief description of a train being "handed over" from one cell to another, followed by an example of how transfers are managed from a train being registered on entry into a cell to the train exiting the cell, which event is detected solely by the absence of any response from the train to interrogations.

Figure 3:
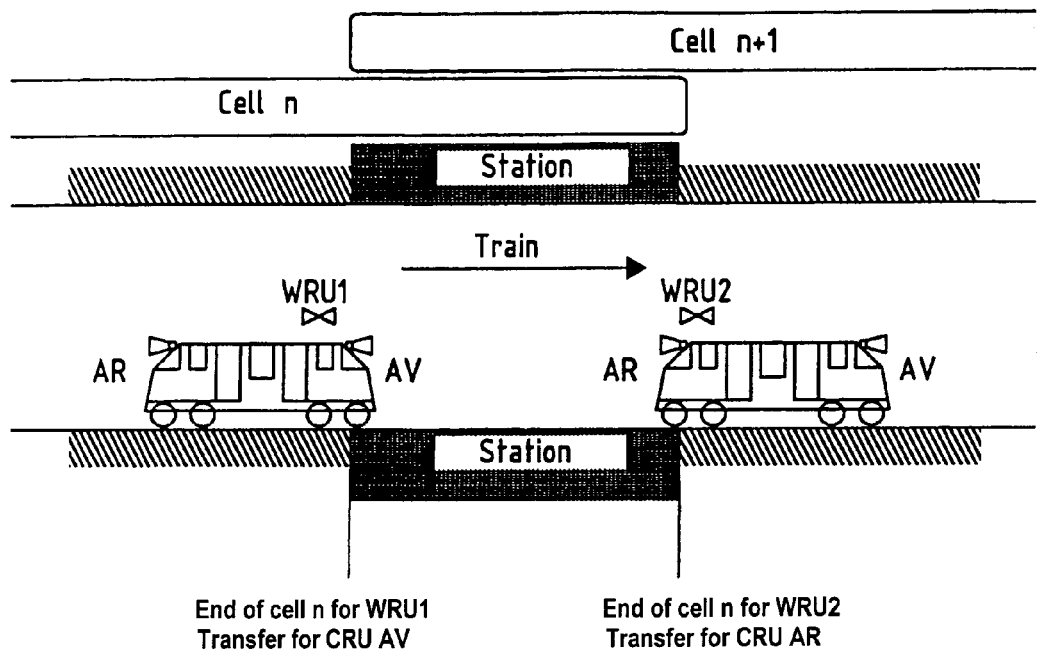
FIG. 3 is a diagram for showing how transfer or "handover" is performed from one cell to another.
Figure 4:
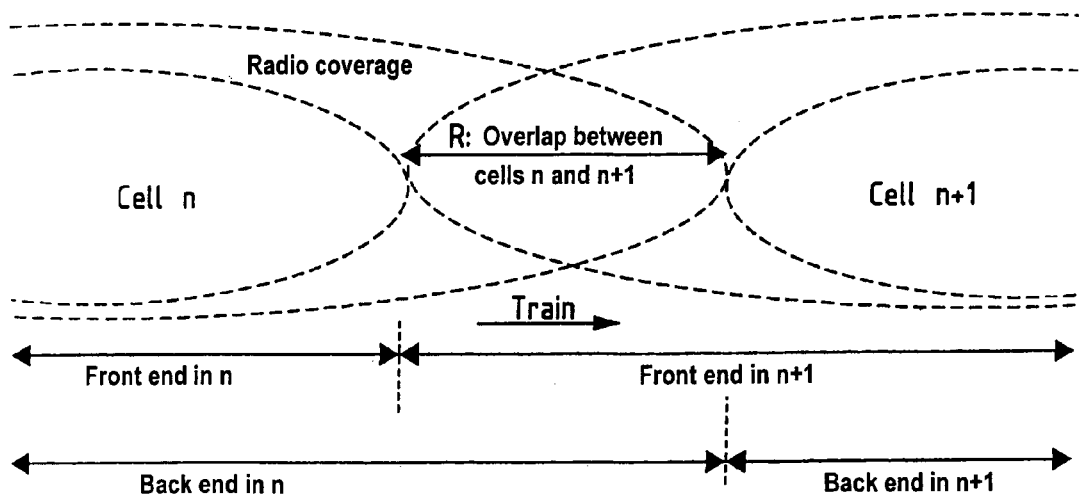
FIG. 4 is a diagram showing the overlap of the lobes of transceivers belonging to two successive cells.

Handover (FIGS. 3 and 4)

As in the earlier patent mentioned above, handover takes place in a strong field in an overlap zone between two radio cells, referenced R. The two car radio units CRU AV and CRU AR at the front and the back of the train respectively perform the transfer in succession. The unit CRU AV performs transfer as soon as it goes past wayside radio unit WRU 1 (train position in continuous lines), where the radio frequency field tapers off since CRU AV is passing into the back lobe. Subsequently the unit CRU AR performs the handover close to the wayside radio unit WRU 2 (dashed line position).

It can be seen that the train begins handover as soon as it has gone past the last wayside unit of the cell it is exiting.

The train signals the beginning of handover by sending the signature frame. The wayside transmission unit then enters the train in the list of trains present in the cell. It deletes the train from the list when lack of response from the train continues beyond a predetermined time-out (e.g. 10 seconds) or a predetermined number of interrogations (e.g. four).

Sequence of Events from Entry Identification to Exit

Figure 5:
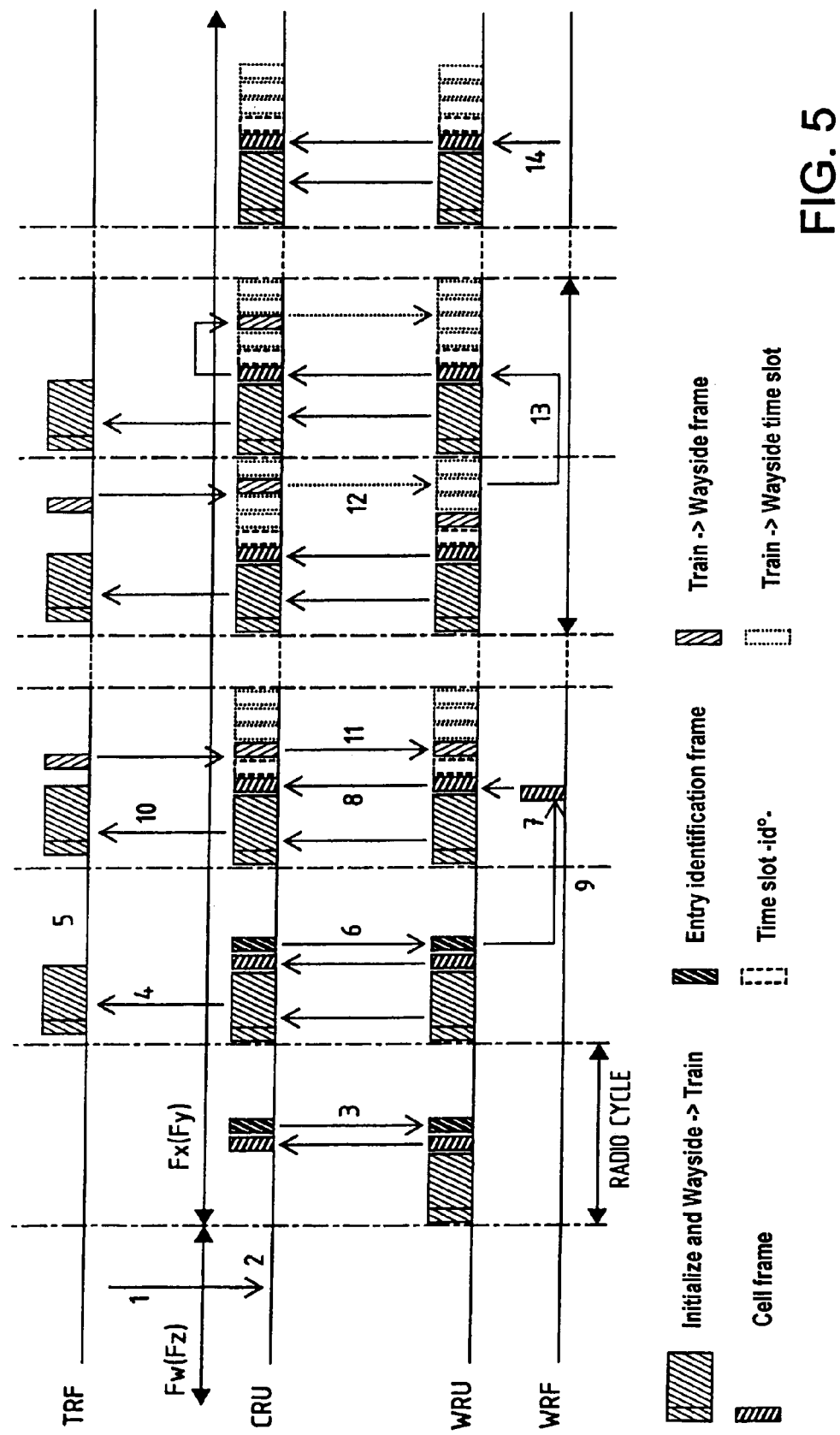
FIG. 5 is a diagram showing an example of how frame transmission is managed in a cycle from a mobile entering a cell to the mobile exiting it.

A typical sequence of successive events from train entry to exit is given in FIG. 5. The units concerned are identified by their abbreviations.

1: TRF sends the entry identification frame to request CRU to search in the cell whose frequencies Fx and Fy and spreading sequence are known, and requesting authorization to transmit.

2, 3, 4: CRU scans the frequencies Fx and Fy to detect the cell control frame, registers itself, and sends the initialization and the data frames to the wayside.

5: TRF uses the database information contained in the initialization frame.

6, 8: CRU is synchronized on the radio cycle of the new cell, and transmits the entry identification frame until it receives a request to send data frames to the wayside.

7: WRF: allocates a time slot to the train in the cell control frame, even if no wayside application requests one; this time slot is given higher priority than the time slots requested by the wayside application for other trains already present in the cell.

9: the wayside radio function WRF, generally in a WTU registers the train in the list of trains present in the cell so that the wayside application can send requests to the new train.

10, 11: CRU sends the content of all of the data frames from the wayside to the train via TRF; it responds to any requests coming from the wayside in the allocated time slot.

12, 13, 14: in the absence of any response from the train to a request from the wayside, the request is repeated, and subsequently the train is deleted from the list of trains present in the cell.

Most collisions between frames that might lead to information not being transferred arise, for example, when two trains are present simultaneously in opposite directions on entry to a cell, and can be resolved by conventional measures. However, processing at an intersection between a plurality of lines requires measures that are somewhat more complex. FIG. 7 shows an intersection between two lines S1 and S2. In the figure, the frequencies allocated to the various cells 1 to 6 that might interfere with one another are seven in number. Possible interference is indicated by double-headed dashed-line arrows. In the example shown, three spreading sequences referenced 1, 2, and 3 are shared between the seven cells that present overlap of their radio fields.

It can also be seen that there exists a cell 1 that is common to both lines S1 and S2.

Risks of confusion are eliminated by combining a suitable selection of the available frequencies and the various spreading sequences while taking care to ensure that there is never more than one frequency in common so as to reduce the probability of simultaneous interference on both radio frequencies of the same cell.

In the example shown, it can be seen that the spreading sequences are different between any two cells that might present interference on a common frequency.

The protocol for allocating time slots to trains during a radio transmission cycle can be summarized as follows.

This is done using the cell control frames which contain a list of trains to which a time slot is allocated.

As soon as a train enters a cell, the wayside cell controller allocates a time slot to the train once it has been identified on entry (sign-in). A deterministic protocol, e.g. using the locations of trains determined with the help of wayside beacons can be used to resolve conflicts when a plurality of trains are simultaneously seeking to be registered in a cell. The time slots allocated to the trains are allocated dynamically from the wayside.

The exit of a train from a cell is detected without dialog between the wayside and the train, merely by the train failing to respond to requests from the wayside.

The wayside cell controller has one or more wayside transmission units and can be designed to request the on-board system to retransmit any information it has failed to received during the cycle which has just ended, thereby making the system more robust without increasing data rate as much as would be the case if repetition were to be performed systematically.

What is claimed is:

1. A cellular system for trains for transmitting and receiving information by radio, the system comprising:

a wayside subsystem comprising a plurality of stationary transceiver stations distributed along a determined path and allocated to successive cells, the transceiver stations of a given cell being spatially separated from each other and comprising at least two transceivers directed toward each other;

a plurality of trains constrained to travel along the determined path, each of the trains carrying a transceiver, and a controller controlling the transceivers of the stationary stations and the transceiver carried by each train such that, while a train of said plurality of trains is in a given cell, exchanges between the transceiver of the train and the transceivers allocated to the given cell take place on two different frequencies in alternation during two successive radio cycles so that for a radio communication between the transceiver of the train and the transceivers allocated to the given cell lasting a plurality of radio cycles in sequence, the communication takes place at a first frequency during a first radio cycle, at a second different frequency during the next radio cycle in the sequence, at the first frequency during the following radio cycle in the sequence after said next radio cycle, at the second frequency during the ensuing radio cycle in the sequence after said following radio cycle and so on, depending on the number of radio cycles, in a repeating pattern alternating between said first and second frequencies so as to provide increased immunity to interference during the radio communication between the transceiver of the train and the transceivers of the given cell.

2. A system according to claim 1, in which each cycle is constituted by a plurality of short exchange frames.

3. A system according to claim 1, using a time division multiple access mode of transmission.

4. A system according to claim 1, in which frames containing essential information are always transmitted on two frequencies in succession.

5. A system according to claim 1, in which the pair of frequencies used in a cell is constituted by two frequencies that are different from the frequencies used in the adjacent cells.

6. A system according to claim 1, in which exchanges between the train of said plurality of trains and the wayside subsystem take place using TDMA and a protocol for allocating time slots to the plurality of trains in which a time slot is allocated to each train entering a cell by a wayside radio unit in response to the train sending an entry identification to the wayside subsystem.

7. A system according to claim 6, in which the exit of a train of said plurality of trains from a cell is detected by repeated failure of the train to respond to a request from the wayside radio unit allocated to the cell.

8. A system according to claim 1, in which each train of said plurality of trains has two car radio units, one placed at the front and the other placed at the back, and designed to enable the two units to be handed over from one cell to another independently and in succession.

* * * * *